United States Patent
Zhang

(10) Patent No.: US 12,232,211 B2
(45) Date of Patent: Feb. 18, 2025

(54) METHOD AND DEVICE USED IN COMMUNICATION NODE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 366 days.

(21) Appl. No.: 17/584,320

(22) Filed: Jan. 25, 2022

(65) Prior Publication Data

US 2022/0240343 A1  Jul. 28, 2022

(30) Foreign Application Priority Data

Jan. 26, 2021  (CN) .......................... 202110101309.X

(51) Int. Cl.
*H04W 76/38* (2018.01)
*H04L 5/00* (2006.01)
*H04W 76/27* (2018.01)

(52) U.S. Cl.
CPC .......... *H04W 76/38* (2018.02); *H04L 5/0053* (2013.01); *H04W 76/27* (2018.02)

(58) Field of Classification Search
CPC ...... H04W 76/38; H04W 76/27; H04L 5/0053
See application file for complete search history.

(56) References Cited

U.S. PATENT DOCUMENTS

2016/0302181 A1* 10/2016  Fujishiro .............. H04W 72/20
2017/0295553 A1* 10/2017  Lee .................... H04W 56/001

FOREIGN PATENT DOCUMENTS

| CN | 109952747 A | 6/2019 |
| CN | 111586843 A | 8/2020 |
| CN | 111800888 A | 10/2020 |
| WO | 2019245443 A2 | 12/2019 |
| WO | 2020253532 A1 | 12/2020 |
| WO | 2021002632 A1 | 1/2021 |

OTHER PUBLICATIONS

3GPP Jan. 15, 2021 LG Electronics Inc,New timer for SD'T failure detection (R2-2100783).
3GPP tsg_ran\wg2_rl2,tsgr2_113-e Jan. 14, 2021 Panasonic Ramp;amp;D Center Germany, R2-2100817 "T319-like timer for theSDT procedure".
First Office Action of the CN202110101309.X dated Oct. 31, 2024.
First Search Report of the CN202110101309.X dated Oct. 25, 2024.
3GPPtsg_ran\wg2_rl2, tsgr2_113-e Jan. 15, 2021 ZTE Corporation, Sanechips, R2-2101162 "Email discussion summary#551:Common aspects between CG and RACH".

* cited by examiner

*Primary Examiner* — Duc C Ho

(57) ABSTRACT

The present disclosure discloses a method and a device in a communication node for wireless communications. A first node transmits a first RRC signaling, and starts a first timer; and receives a first information block, the first RRC signaling being used to trigger the first information block; and, in response to the behavior of receiving a first information block, stops or restarts the first timer; herein, the first RRC signaling is used for requesting data transmission; the first information block belongs to a lower layer relative to an RRC layer. The present disclosure ensures small data transmission; avoids the impact of timer overrunning on data transmission; and uses existing signaling to reduce signaling overhead.

20 Claims, 4 Drawing Sheets

METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202110101309.X, filed on Jan. 26, 2021, the full disclosure of which is incorporated herein by reference.

BACKGROUND

Technical Field

The present disclosure relates to transmission methods and devices in wireless communication systems, and in particular to a method and a device for transmission of small-packet traffics.

Related Art

New Radio (NR) supports Radio Resource Control_I-NACTIVE (RRC_INACTIVE) State till the 3GPP Rel-16 in which data transmission is no longer supported in an RRC_INACTIVE State. When a User Equipment (UE) in an RRC_INACTIVE state has infrequent small data packets needed to be transmitted in a periodic or aperiodic manner, it shall resume connection in the first place, that is to shift to an RRC_CONNECTED state, and won't change back to the RRC_INACTIVE state until data transmission is completed. As was decided at the 3GPP RAN #86 meetings, a Work Item (WI) of "NR INACTIVE state Small Data Transmission (SDT)" will be conducted to study the technique of small data packet transmission in an RRC_INACTIVE state, including transmitting uplink data on pre-configured Physical Uplink Shared Channel (PUSCH) resources, or carrying data by means of either a Message 3 (Msg3) or a Message B (MsgB) in a Random Access (RA) procedure.

When a UE is in RRC_INACTIVE state, it will send a CCCH message during Small Data Transmission (SDT) and, in addition, starts a timer to monitor whether it can receive a RRC signaling responded back in a timely manner. Upon reception of the CCCH message the base station will send an RRC signaling as a response; The UE, which receives the responded RRC signaling, will then perform reconfiguration that influences subsequent data transmission; even if the base station postpones the transmission of the RRC signaling, the UE will still release connection due to timer overrun, thus impacting the data transmission.

SUMMARY

By deferring the transmission of RRC signaling, a UE is prevented from performing reconfiguration as small data is being transmitted, but it would be necessary to optimize the mechanism of timer management to avoid impact on data caused by timer overrun. To address the above problem, the present disclosure provides a solution. The statement above only took NR scenarios for example, though; The present disclosure is also applicable to scenarios such as Long Term Evolution (LTE) or NarrowBand Internet of Things (NB-IoT), where similar technical effects can be achieved. Additionally, the adoption of a unified solution for various scenarios contributes to the reduction of hardcore complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:

transmitting a first RRC signaling, and starting a first timer; and receiving a first-type information block, the first RRC signaling being used to trigger the first-type information block; in response to the action of receiving a first-type information block, stopping or restarting the first timer;

herein, the first RRC signaling is used to request for data transmission; the first-type information block belongs to a lower layer relative to an RRC layer.

In one embodiment, the first RRC signaling comprises a Common Control CHannel (CCCH) message.

In one embodiment, the first RRC signaling is a Radio Resource Control signaling.

In one embodiment, the first RRC signaling is transmitted through an RRC layer message.

In one embodiment, a Signaling Radio Bearer (SRB) for the first RRC signaling includes SRB0.

In one embodiment, the first RRC signaling comprises one or more Information Elements (IEs) in an RRC message.

In one embodiment, the first timer is an RRC layer timer.

In one embodiment, the first timer is maintained by a lower layer relative to an RRC layer.

In one embodiment, the first-type information block comprises Downlink Control Information (DCI).

In one embodiment, the first-type information block comprises DownLink (DL) grant DCI.

In one embodiment, the first-type information block comprises UpLink (UL) Grant.

In one embodiment, the first-type information block comprises UL grant DCI.

In one embodiment, the phrase that the first RRC signaling is used to request for data transmission comprises that: the first RRC signaling comprises a first field, the first field being used to request for data transmission.

In one embodiment, the first field indicates a resume-Cause, and value of the resumeCause indicates that there is data to be transmitted.

In one embodiment, the first field indicates UE assistant information, and the UE assistant information indicates that there is data to be transmitted.

In one embodiment, the first field indicates a user buffer status.

In one embodiment, in response to the action of receiving a first-type information block, stop the first timer.

In one embodiment, in response to the action of receiving a first-type information block, restart the first timer.

In one embodiment, the first timer is maintained by a lower layer relative to an RRC layer.

In one embodiment, the lower layer relative to the RRC layer in the present disclosure includes: physical layer.

In one embodiment, the lower layer relative to the RRC layer in the present disclosure includes: MAC layer.

In one embodiment, the lower layer relative to the RRC layer in the present disclosure includes: RLC layer.

In one embodiment, the lower layer relative to the RRC layer in the present disclosure includes: PDCP layer.

According to one aspect of the present disclosure, characterized in comprising:

in response to a first event, the first RRC signaling is transmitted, and the first timer is started.

In one embodiment, the first event comprises that data to be transmitted has arrived on at least one logical channel in a first logical channel set.

In one embodiment, the first event comprises that data to be transmitted in a first logical channel set exceeds a first threshold.

In one embodiment, the first event comprises that data to be transmitted in a first logical channel set does not exceed a first threshold.

In one embodiment, the first threshold is configured through a second RRC signaling.

In one embodiment, the first threshold is configured through a system message.

In one embodiment, the first threshold is configured through a higher layer signaling.

In one embodiment, the first threshold is configurable.

In one embodiment, the first threshold is pre-configured.

In one embodiment, the first threshold is of a fixed size.

According to another aspect of the present disclosure, characterized in comprising:

the first RRC signaling being transmitted through a first uplink radio signal.

In one embodiment, the first uplink radio signal comprises a first MAC sub-PDU, and a logical channel corresponding to the first MAC sub-PDU belongs to the first logical channel set.

In one embodiment, the first uplink radio signal comprises a second MAC sub-PDU, and a logical channel corresponding to the second MAC sub-PDU belongs to the first logical channel set.

In one embodiment, the first uplink radio signal comprises a third MAC sub-PDU, the third MAC sub-PDU indicating a buffer status.

In one embodiment, the first MAC sub-PDU and the second MAC sub-PDU belong to a same MAC PDU.

In one embodiment, the first MAC sub-PDU and the third MAC sub-PDU belong to a same MAC PDU.

In one embodiment, the first MAC sub-PDU, the second MAC sub-PDU and the third MAC sub-PDU belong to a same MAC PDU.

In one embodiment, the phrase that the first uplink radio signal is used to request for data transmission comprises that: the first uplink radio signal comprises a third MAC sub-PDU, the third MAC sub-PDU indicating a buffer status.

In one embodiment, the phrase that the first RRC signaling is used to request for data transmission comprises that: the first uplink radio signal is used to request for data transmission.

In one embodiment, the phrase that the first RRC signaling is used to request for data transmission comprises that: a third MAC sub-PDU comprised in the first uplink radio signal is used to request for data transmission.

In one embodiment, the buffer status in the present disclosure includes: a user buffer status.

In one embodiment, the buffer status in the present disclosure includes: a Buffer Status Report (BSR).

The present disclosure provides a method in a second node for wireless communications, comprising:

receiving a first RRC signaling; and transmitting a first-type information block, the first RRC signaling being used to trigger the first-type information block;

herein, the first RRC signaling is used to request for data transmission; the first-type information block belongs to a lower layer relative to an RRC layer; the first-type information block is used to trigger stopping or restarting of a first timer.

The present disclosure provides a first node for wireless communications, comprising:

a first transmitter, transmitting a first RRC signaling, and starting a first timer; and a first receiver, receiving a first-type information block, the first RRC signaling being used to trigger the first-type information block;

the first transmitter, in response to the action of receiving a first-type information block, stopping or restarting the first timer;

herein, the first RRC signaling is used to request for data transmission; the first-type information block belongs to a lower layer relative to an RRC layer.

The present disclosure provides a second node for wireless communications, comprising:

a second receiver, receiving a first RRC signaling; and a second transmitter, transmitting a first-type information block, the first RRC signaling being used to trigger the first-type information block;

herein, the first RRC signaling is used to request for data transmission; the first-type information block belongs to a lower layer relative to an RRC layer; the first-type information block is used to trigger stopping or restarting of a first timer.

In one embodiment, compared with the prior art, the present disclosure is advantageous in the following aspects:

guaranteeing small data packet transmission; for avoidance of the impact of timer overrun on data transmission;

making use of already-available signalings to reduce signaling overhead.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
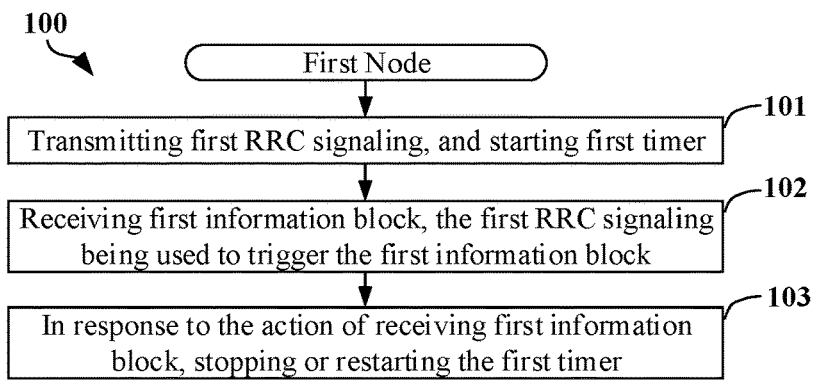
FIG. 1 illustrates a flowchart of transmission of a first message and a second message according to one embodiment of the present disclosure.

Embodiment 1 illustrates a flowchart of transmission of a first message and a second message according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure transmits a first RRC signaling and starts a first timer in step 101; in step 102, receives a first-type information block, the first RRC signaling being used to trigger the first-type information block; in step 103, in response to the action of receiving a first-type information block, stops or restarts the first timer;

herein, the first RRC signaling is used to request for data transmission; the first-type information block belongs to a lower layer relative to an RRC layer.

In one embodiment, the first RRC signaling is a Radio Resource Control signaling.

In one embodiment, the first RRC signaling is transmitted through an RRC layer message.

In one embodiment, the first RRC signaling is generated by an RRC layer.

In one embodiment, the first RRC signaling is a higher layer signaling.

In one embodiment, a Signaling Radio Bearer (SRB) for the first RRC signaling includes SRB0.

In one embodiment, the first RRC signaling comprises one or more Information Elements (IEs) in an RRC message.

In one embodiment, the first RRC signaling comprises all or part of an RRC message.

In one embodiment, the first RRC signaling comprises a Common Control CHannel (CCCH) message.

In one embodiment, the first RRC signaling is transmitted via an air interface.

In one embodiment, the first RRC signaling is transmitted via an antenna port.

In one embodiment, the first RRC signaling comprises a Downlink (DL) message.

In one embodiment, the first RRC signaling comprises a Sidelink (SL) message.

In one embodiment, the first timer is maintained by an RRC layer.

In one embodiment, the first timer is an RRC layer timer.

In one embodiment, the first timer is maintained by a lower layer relative to an RRC layer.

In one embodiment, the lower layer relative to the RRC layer in the present disclosure includes: physical layer.

In one embodiment, the lower layer relative to the RRC layer in the present disclosure includes: MAC layer.

In one embodiment, the lower layer relative to the RRC layer in the present disclosure includes: RLC layer.

In one embodiment, the lower layer relative to the RRC layer in the present disclosure includes: PDCP layer.

In one embodiment, the first timer is a MAC layer timer.

In one embodiment, the first timer's name includes timer.

In one embodiment, the first timer's name includes Window.

In one embodiment, the first timer's name includes T3.

In one embodiment, the first timer's names include at least one of sdt, idt, edt or inactive, or small, or data, or early.

In one embodiment, the action of starting a first timer comprises that: the first timer begins its time-counting.

In one embodiment, the action of starting a first timer comprises that: the first timer begins to count from 0.

In one embodiment, the action of starting a first timer comprises that: the first timer begins to count from an expiration value of the first timer.

In one embodiment, the action of starting a first timer comprises that: the first timer starts running.

In one embodiment, the action of starting a first timer comprises that: setting the first timer to 0.

In one embodiment, the action of starting a first timer comprises that: setting the first timer to 1.

In one embodiment, the action of starting a first timer comprises that: setting the first timer to an expiration value of the first timer.

In one embodiment, the expiration value of the first timer is configured through a second RRC signaling.

In one embodiment, the expiration value of the first timer is configurable.

In one embodiment, the expiration value of the first timer is pre-configured.

In one embodiment, the expiration value of the first timer is of a fixed size.

In one embodiment, the expiration value of the first timer comprises a positive integer number of millisecond (s) (ms).

In one embodiment, the expiration value of the first timer comprises a positive integer number of minute(s).

In one embodiment, the expiration value of the first timer comprises a positive integer number of second(s) (s).

In one embodiment, the expiration value of the first timer comprises a positive integer number of hour(s).

In one embodiment, the expiration value of the first timer comprises a positive integer number of slot(s).

In one embodiment, the slot comprises at least one of slot(s), or subframe(s), or Radio Frame(s), or multiple Orthogonal Frequency Division Multiplexing (OFDM) symbols, or multiple Single Carrier Frequency Division Multiple Access (SC-FDMA) symbols.

In one embodiment, in response to a first event, the first RRC signaling is transmitted, and the first timer is started.

In one embodiment, the first event comprises that data to be transmitted has arrived on at least one logical channel in a first logical channel set.

In one embodiment, the first event comprises that data to be transmitted in a first logical channel set exceeds a first threshold.

In one embodiment, the first event comprises that data to be transmitted in a first logical channel set does not exceed a first threshold.

In one embodiment, the first event comprises that data to be transmitted in a first logical channel set is smaller than or equals a first threshold.

In one embodiment, the first event comprises that data to be transmitted in a first logical channel set is smaller than a first threshold.

In one embodiment, the first event comprises the existence of a Pending BSR and the Pending BSR is triggered by data in a first logical channel set.

In one embodiment, the first event comprises that data to be transmitted in any logical channel in a first logical channel set exceeds a first threshold.

In one embodiment, the first event comprises that data to be transmitted in any logical channel in a first logical channel set does not exceed a first threshold.

In one embodiment, the first event comprises that data to be transmitted in any logical channel in a first logical channel set is smaller than or equal to a first threshold.

In one embodiment, the first threshold is configured through a second RRC signaling.

In one embodiment, the first threshold is configured through a system message.

In one embodiment, the first threshold is configured through a higher layer signaling.

In one embodiment, the first threshold is configurable.

In one embodiment, the first threshold is pre-configured.

In one embodiment, the first threshold is of a fixed size.

In one embodiment, the first threshold is measured in bits.

In one embodiment, the first threshold is measured in bytes.

In one embodiment, the first logical channel set comprises at least one logical channel.

In one subembodiment, the first logical channel set comprises multiple logical channels, with the logical channel being one of the multiple logical channels.

In one subembodiment, the first logical channel set comprises K logical channels, with the logical channel being one of the K logical channels, where K is a positive integer greater than 1.

In one embodiment, any logical channel in the first logical channel set supports Small Data Transmission (SDT).

In one embodiment, a Radio Bearer (BR) for any logical channel in the first logical channel set indicates SDT.

In one embodiment, any logical channel in the first logical channel set is in one-to-one correspondence relation with a Data Radio Bearer (DRB).

In one embodiment, the phrase of supporting SDT in the present disclosure comprises: being configured with SDT resources.

In one embodiment, the phrase of supporting SDT in the present disclosure comprises: having corresponding SDT resources.

In one embodiment, the SDT resources in the present disclosure comprise: RACH-based SDT resources.

In one embodiment, the SDT resources in the present disclosure comprise: PRACH-based SDT resources.

In one embodiment, the SDT resources in the present disclosure comprise: Random-Access (RA)-based SDT resources.

In one embodiment, the SDT resources in the present disclosure comprise: CG-based SDT resources.

In one embodiment, the SDT resources in the present disclosure are acquired by means of a system message.

In one embodiment, the SDT resources in the present disclosure are acquired by means of a dedicated signaling.

In one embodiment, the dedicated signaling includes a UE-specific signaling.

In one embodiment, the dedicated signaling includes an RRC signaling.

In one embodiment, any logical channel in the first logical channel set supports Inactive Data Transmission (IDT).

In one embodiment, the phrase of supporting EDT in the present disclosure comprises: being configured with EDT resources.

In one embodiment, the phrase of supporting EDT in the present disclosure comprises: having corresponding EDT resources.

In one embodiment, any logical channel in the first logical channel set supports Early Data Transmission (EDT).

In one embodiment, the phrase of supporting IDT in the present disclosure comprises: being configured with IDT resources.

In one embodiment, the phrase of supporting IDT in the present disclosure comprises: having corresponding IDT resources.

In one embodiment, any logical channel in the first logical channel set corresponds to a logical channel type being Dedicated Control CHannel (DCCH).

In one embodiment, any logical channel in the first logical channel set corresponds to a logical channel used for data transmission.

In one embodiment, any logical channel in the first logical channel set corresponds to DRB.

In one embodiment, in response to a first event, first indication is transmitted from the RRC layer to the lower layer relative to the RRC layer, the first indication being used to start a first timer.

In one embodiment, in response to a first event, second indication is transmitted from the lower layer relative to the RRC layer to the RRC layer, the second indication being used to start a first timer.

In one embodiment, the action of transmitting a first RRC signaling and the action of starting a first timer are atomic.

In one embodiment, as a response to the action of transmitting a first RRC signaling, the first timer is started.

In one embodiment, in response to transmitting the first RRC signaling, first indication is transmitted from the RRC layer to the lower layer relative to the RRC layer, the first indication being used to start a first timer.

In one embodiment, the phrase that "as a response to the action of transmitting a first RRC signaling, the first timer is started" comprises that: transmitting a first RRC signaling is used to trigger the start of the first timer.

In one embodiment, the phrase that the first RRC signaling is used to request for data transmission comprises that: the first RRC signaling comprises a first field, the first field being used to request for data transmission.

In one embodiment, the first field indicates a resumeCause, and value of the resumeCause indicates that there is data to be transmitted.

In one embodiment, the first field indicates UE assistant information.

In one embodiment, the UE assistant information indicates that there is data to be transmitted.

In one embodiment, the UE assistant information indicates Channel Status Information (CSI).

In one embodiment, the first field indicates a user buffer status.

In one embodiment, the first field indicates a buffer status.

In one embodiment, the first field indicates a BSR.

In one embodiment, number of bit(s) comprised in the first field is N, N being a positive integer greater than or equal to 1.

In one embodiment, N is equal to 1.

In one embodiment, the first field being set to 0 indicates that a user has data to be transmitted, while the first field being set to 1 indicates that a user has no data to be transmitted.

In one embodiment, the first field being set to 1 indicates that a user has data to be transmitted, while the first field being set to 0 indicates that a user has no data to be transmitted.

In one embodiment, N is equal to 2.

In one embodiment, the first field being set to '00' indicates that a user has no data to be transmitted, the first field being set to '01' indicates that the data to be transmitted is greater than or equal to a first threshold, the first field being set to '10' indicates that the data to be transmitted is greater than or equal to a second threshold, while the first field being set to '11' indicates that the data to be transmitted is greater than or equal to a third threshold.

In one embodiment, the first field being set to '00' indicates that a user has no data to be transmitted, the first field being set to '01' indicates that the data to be transmitted is greater than a first threshold, the first field being set to '10' indicates that the data to be transmitted is greater than a second threshold, while the first field being set to '11' indicates that the data to be transmitted is greater than a third threshold.

In one embodiment, the phrase that a user has data to be transmitted in the present disclosure comprises: data would be transmitted.

In one embodiment, the phrase that a user has data to be transmitted in the present disclosure comprises: data is contained in a buffer.

In one embodiment, the phrase that a user has no data to be transmitted in the present disclosure comprises: no data would be transmitted.

In one embodiment, the phrase that a user has data to be transmitted in the present disclosure comprises: the user has subsequent Small Data Transmission.

In one embodiment, the phrase that a user has data to be transmitted in the present disclosure comprises: the user has subsequent transmissions.

In one embodiment, the phrase that a user has data to be transmitted in the present disclosure comprises: the user has data that would be transmitted.

In one embodiment, the phrase that a user has data to be transmitted in the present disclosure comprises: the user has subsequent data that would be transmitted.

In one embodiment, the phrase that a user has data to be transmitted in the present disclosure comprises: the user has subsequent data.

In one embodiment, the phrase that a user has data to be transmitted in the present disclosure comprises: a user buffer status.

In one embodiment, the phrase that a user has data to be transmitted in the present disclosure comprises: the user has data that would be transmitted, by means of SDT.

In one embodiment, the phrase that a user has data to be transmitted in the present disclosure comprises: the user has subsequent data that would be transmitted, by means of SDT.

In one embodiment, the phrase of the first field being used to request for data transmission comprises that: whether the first RRC signaling is used to request for data transmission depends on whether the first field exists.

In one embodiment, the phrase of the first field being used to request for data transmission comprises that: existence of the first field is used to determine whether the first RRC signaling is used to request for data transmission.

In one embodiment, the phrase of the first field being used to request for data transmission comprises that: when the first field exists, the first RRC signaling is used to request for data transmission; when the first field does not exist, the first RRC signaling isn't used to request for data transmission.

In one embodiment, the first-type information block comprises Downlink Control Information (DCI).

In one embodiment, the first-type information block comprises DownLink (DL) grant DCI.

In one embodiment, the first-type information block comprises UpLink (UL) Grant.

In one embodiment, the first-type information block comprises UL grant DCI.

In one embodiment, the first-type information block comprises a Physical Downlink Control Channel (PDCCH).

In one embodiment, the first-type information block comprises a physical layer signaling.

In one embodiment, the first-type information block comprises a first MAC CE.

In one subembodiment, the first MAC CE indicates restarting of the first timer.

In one subembodiment, the first MAC CE indicates stopping of the first timer.

In one subembodiment, the first MAC CE indicates an overrun value for the first timer.

In one embodiment, the first-type information block comprises a RLC Control Protocol Data Unit (PDU).

In one embodiment, the first-type information block comprises a downlink channel.

In one embodiment, the first-type information block comprises a downlink transmission.

In one embodiment, the first-type information block comprises a downlink radio signal.

In one embodiment, the first-type information block is received in a first time-frequency resource pool, the first time-frequency resource pool being used for the first status.

In one embodiment, the first-type information block is received in a second time-frequency resource pool, the second time-frequency resource pool being used for receiving a response to SDT.

In one embodiment, the phrase of the first RRC signaling being used to trigger the first-type information block comprises that: information in the first RRC signaling is used to trigger the first-type information block.

In one embodiment, the phrase of the first RRC signaling being used to trigger the first-type information block comprises that: the action of transmitting a first RRC signaling is used to trigger the first-type information block.

In one embodiment, the phrase of the first RRC signaling being used to trigger the first-type information block comprises that: a first field in the first RRC signaling is used to trigger the first-type information block.

In one embodiment, the phrase that the first uplink radio signal is used to trigger the first-type information block comprises: the first MAC sub-PDU being used to trigger the first-type information block.

In one embodiment, the phrase that the first uplink radio signal is used to trigger the first-type information block comprises: the second MAC sub-PDU being used to trigger the first-type information block.

In one embodiment, the phrase that the first uplink radio signal is used to trigger the first-type information block comprises: the third MAC sub-PDU being used to trigger the first-type information block.

In one embodiment, the phrase that the first uplink radio signal is used to trigger the first-type information block comprises: when the first uplink radio signal is comprised of M1 MAC sub-PDU(s), the first uplink radio signal is used to trigger the first-type information block, and a logical channel corresponding to any MAC sub-PDU among the M1 MAC sub-PDU(s) belongs to the first logical channel group, M1 being a positive integer greater than or equal to 1.

In one subembodiment, M1 is equal to 1.

In one subembodiment, M1 is equal to 2.

In one subembodiment, M1 is equal to 3.

In one subembodiment, M1 is no greater than 1024.

In one subembodiment, M1 is no greater than 10000.

In one embodiment, the phrase that in response to the action of receiving a first-type information block comprises: as a response to receiving the first-type information block.

In one embodiment, the phrase that in response to the action of receiving a first-type information block comprises: as a response to processing the first-type information block.

In one embodiment, the phrase that in response to the action of receiving a first-type information block comprises: as a response to executing configuration information indicated by the first-type information block.

In one embodiment, in response to the action of receiving a first-type information block, stop the first timer.

In one embodiment, in response to the action of receiving a first-type information block, restart the first timer.

In one embodiment, in response to the action of receiving a first-type information block, transmit third indication from the lower layer relative to a RRC layer to the RRC layer, the third indication being used to stop the first timer.

In one embodiment, in response to the action of receiving a first-type information block, transmit third indication from a layer to which the first-type information block belongs to the RRC layer, the third indication being used to stop the first timer.

In one embodiment, in response to the action of receiving a first-type information block, transmit third indication from a layer processing the first-type information block to the RRC layer, the third indication being used to stop the first timer.

In one embodiment, in response to the action of receiving a first-type information block, transmit fourth indication from the lower layer relative to a RRC layer to the RRC layer, the fourth indication being used to restart the first timer.

In one embodiment, in response to the action of receiving a first-type information block, transmit fourth indication from a layer to which the first-type information block belongs to the RRC layer, the fourth indication being used to restart the first timer.

In one embodiment, in response to the action of receiving a first-type information block, transmit fourth indication from a layer processing the first-type information block to the RRC layer, the fourth indication being used to restart the first timer.

In one embodiment, the action of stopping the first timer comprises that: the first timer stops running.

In one embodiment, the action of stopping the first timer comprises that: the first timer stops its time-counting.

In one embodiment, the action of stopping the first timer comprises that: storing values of the first timer.

In one embodiment, the action of restarting a first timer comprises that: the first timer begins its time-counting.

In one embodiment, the action of restarting a first timer comprises that: the first timer restarts its time-counting.

In one embodiment, the action of restarting a first timer comprises that: the first timer starts running.

In one embodiment, the action of restarting a first timer comprises that: the first timer restarts running.

In one embodiment, the action of restarting a first timer comprises that: an initial value for the first timer is set to 0.

In one embodiment, the action of restarting a first timer comprises that: an initial value for the first timer is set to an expiration value of the first timer.

In one embodiment, the action of restarting a first timer comprises that: the first timer begins to count from 0.

In one embodiment, the action of restarting a first timer comprises that: the first timer begins to count from an expiration value of the first timer.

In one embodiment, the phrase that in response to an action comprises: when the action takes place.

In one embodiment, the phrase that in response to an action comprises: as a next step following the action.

In one embodiment, the phrase that in response to an action comprises: if the action occurs.

In one embodiment, the phrase that in response to an action comprises: subsequent actions being triggered by the action.

In one embodiment, compared with the prior art, the present disclosure is advantageous in the following aspects:
- guaranteeing small data packet transmission; for avoidance of the impact of timer overrun on data transmission;
- making use of already-available signalings to reduce signaling overhead.

Embodiment 2

Figure 2:
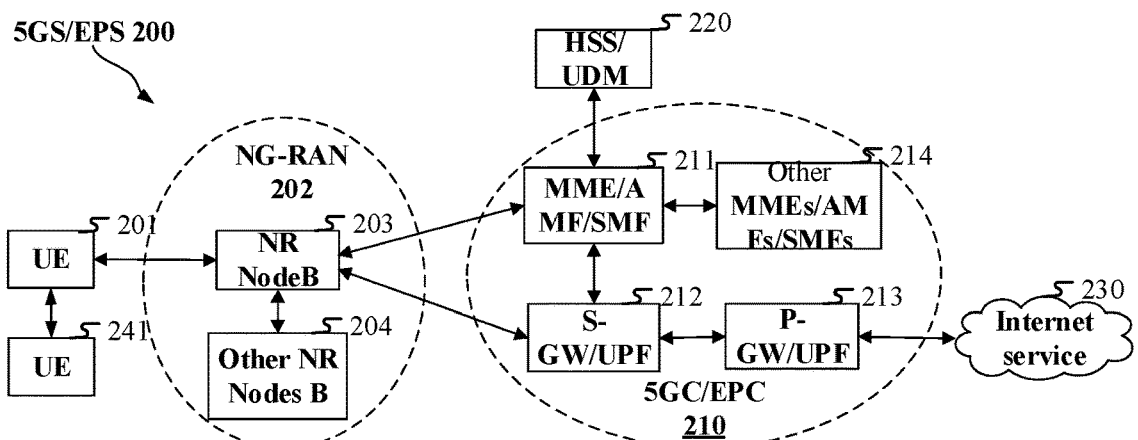
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LIE) and Long-Term Evolution Advanced (LIE-A) systems. The 5G NR or LIE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a UE.

In one embodiment, the gNB203 corresponds to the second node in the present disclosure.

In one embodiment, the gNB203 is a BaseStation (BS).

In one embodiment, the gNB203 is a UE.

In one embodiment, the gNB203 is a relay.

In one embodiment, the gNB203 is a Gateway.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE comprises an aircraft.

In one embodiment, the UE comprises a vehicle-mounted terminal.

In one embodiment, the UE comprises a vessel.

In one embodiment, the UE comprises an Internet-of-Things (IoT) terminal.

In one embodiment, the UE comprises an Industrial IoT (IIoT) terminal.

In one embodiment, the UE is a piece of equipment supporting transmissions with low delay and high reliability.

In one embodiment, the UE comprises test equipment.

In one embodiment, the UE comprises a signaling test instrument.

In one embodiment, the base station supports transmissions in NTN.

In one embodiment, the base station supports transmissions in large-delay-difference networks.

In one embodiment, the base station supports transmissions in TN.

In one embodiment, the base station comprises a Macro-Cellular base station.

In one embodiment, the base station comprises a Micro Cell base station.

In one embodiment, the base station comprises a Pico Cell base station.

In one embodiment, the base station comprises a Femto-cell.

In one embodiment, the base station comprises a base station device supporting large time-delay difference.

In one embodiment, the base station comprises a flight platform.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling test instrument.

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises a L3 relay.

In one embodiment, the relay comprises a L2 relay.

In one embodiment, the relay comprises a Router.

In one embodiment, the relay comprises an Exchanger.

In one embodiment, the relay comprises a UE.

In one embodiment, the relay comprises a base station.

Embodiment 3

Figure 3:
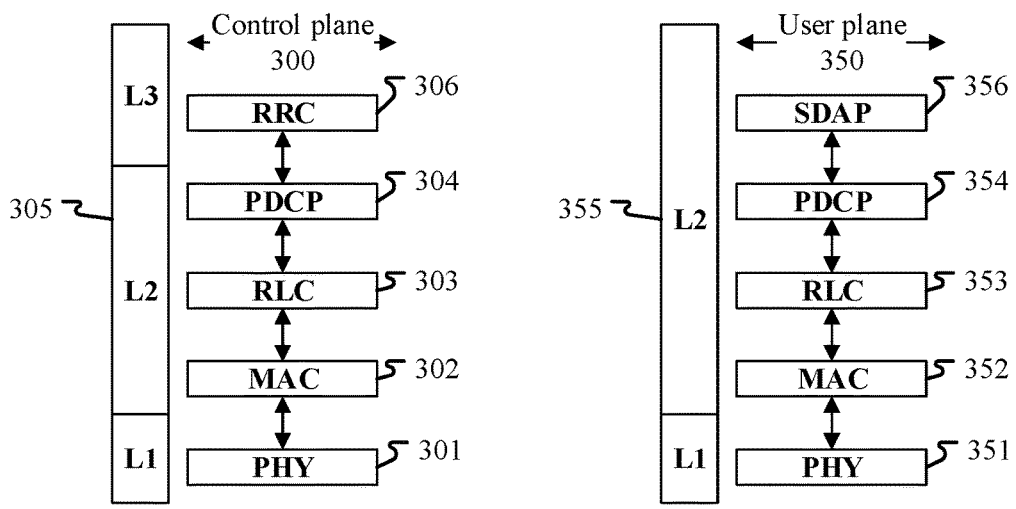
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first RRC signaling in the present disclosure is generated by the RRC 306.

In one embodiment, the second RRC signaling in the present disclosure is generated by the RRC 306.

In one embodiment, the third RRC signaling in the present disclosure is generated by the RRC 306.

In one embodiment, the first-type information block in the present disclosure is generate by the MAC302 or the MAC352.

In one embodiment, the first-type information block in the present disclosure is generated by the PHY301 or the PHY351.

In one embodiment, the first uplink radio signal in the present disclosure is generated by the PHY301 or the PHY351.

In one embodiment, the second uplink radio signal in the present disclosure is generated by the PHY301 or the PHY351.

Embodiment 4

Figure 4:
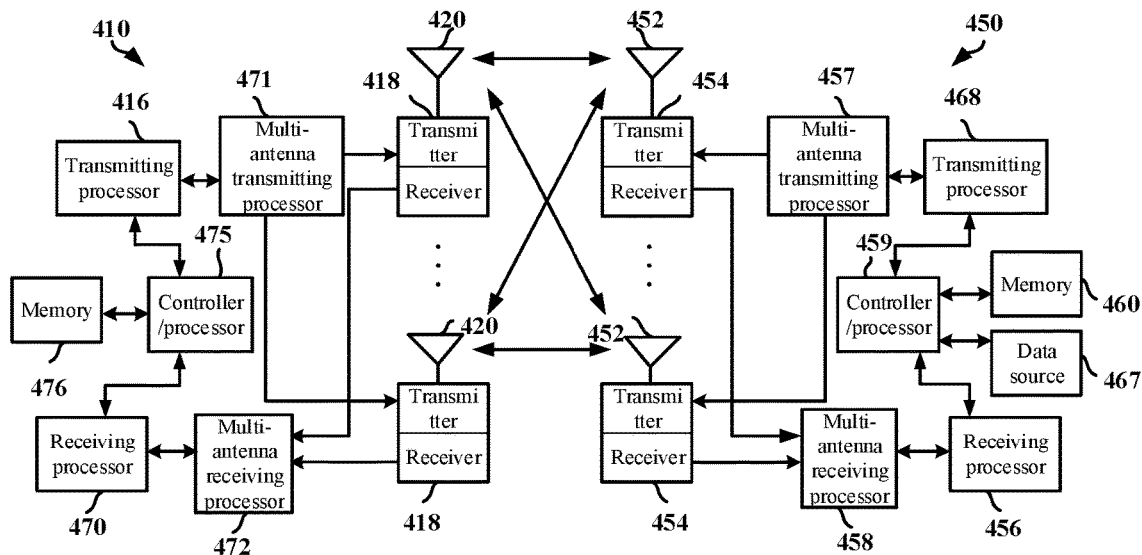
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor. the first communication device 450 at least: transmits a first RRC signaling, and starting a first timer; and receives a first-type information block, the first RRC signaling being used to trigger the first-type information block; in response to the action of receiving a first-type information block, stops or restarts the first timer; herein, the first RRC signaling is used to request for data transmission; the first-type information block belongs to a lower layer relative to an RRC layer.

In one embodiment, the first communication node 450 comprises a memory that stores a computer readable instruction program, the computer readable instruction program generates actions when executed by at least one processor, which include: transmitting a first RRC signaling, and starting a first timer; and receiving a first-type information block, the first RRC signaling being used to trigger the first-type information block; in response to the action of receiving a first-type information block, stopping or restarting the first timer; herein, the first RRC signaling is used to request for data transmission; the first-type information block belongs to a lower layer relative to an RRC layer.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: receives a first RRC signaling; and transmits a first-type information block, the first RRC signaling being used to trigger the first-type information block; herein, the first RRC signaling is used to request for data transmission; the first-type information block belongs to a lower layer relative to an RRC layer; the first-type information block is used to trigger stopping or restarting of a first timer.

In one embodiment, the second communication node 410 comprises a memory that stores a computer readable instruction program, the computer readable instruction program generates actions when executed by at least one processor, which include: receiving a first RRC signaling; and transmitting a first-type information block, the first RRC signaling being used to trigger the first-type information block; herein, the first RRC signaling is used to request for data transmission; the first-type information block belongs to a lower layer relative to an RRC layer; the first-type information block is used to trigger stopping or restarting of a first timer.

In one embodiment, the antenna 452, the receiver 454, the receiving processor 456, and the controller/processor 459 are used for receiving a first RRC signaling; at least one of the antenna 420, the transmitter 418, the transmitting processor 416 or the controller/processor 475 is used for transmitting a first RRC signaling.

In one embodiment, the antenna 452, the transmitter 454, the transmitting processor 468 and the controller/processor 459 are used for transmitting a second RRC signaling; at least one of the antenna 420, the receiver 418, the receiving processor 470 or the controller/processor 475 is used for receiving a second RRC signaling.

In one embodiment, the antenna 452, the transmitter 454, the transmitting processor 468 and the controller/processor 459 are used for transmitting a first-type information block; at least one of the antenna 420, the receiver 418, the receiving processor 470 or the controller/processor 475 is used for receiving a first first-type information block.

In one embodiment, the antenna 452, the receiver 454, the receiving processor 456, and the controller/processor 459 are used for receiving a third RRC signaling; at least one of the antenna 420, the transmitter 418, the transmitting processor 416 or the controller/processor 475 is used for transmitting a third RRC signaling.

In one embodiment, the antenna 452, the receiver 454, the receiving processor 456, and the controller/processor 459 are used for receiving a first uplink radio signal; at least one of the antenna 420, the transmitter 418, the transmitting processor 416 or the controller/processor 475 is used for transmitting a first uplink radio signal.

In one embodiment, the antenna 452, the receiver 454, the receiving processor 456, and the controller/processor 459 are used for receiving a second uplink radio signal; at least one of the antenna 420, the transmitter 418, the transmitting processor 416 or the controller/processor 475 is used for transmitting a second uplink radio signal.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a UE.

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5

Figure 5:
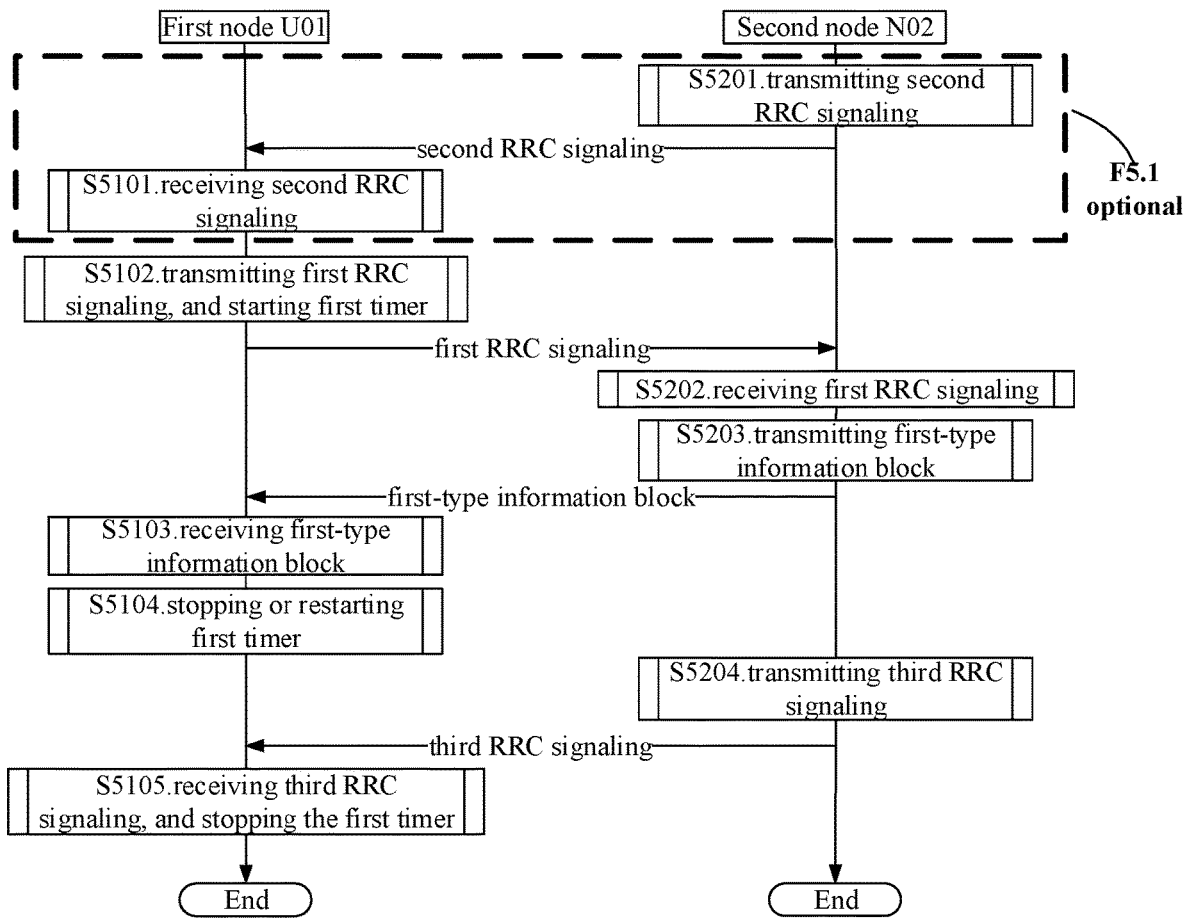
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. It should be particularly noted that the sequence illustrated herein does not set any limit to the signal transmission order or implementation order in the present disclosure.

The first node U01 receives a second RRC signaling in step S5101, the second RRC signaling indicating an expiration value of the first timer; in step S5102, transmits a first RRC signaling, and starts a first timer; and in step 102, receives a first-type information block, the first RRC signaling being used to trigger the first-type information block; in step S5104, in response to the action of receiving a first-type information block, stops or restarts the first timer; in step S5105, receives a third RRC signaling, and stops the first timer.

The second node N02 transmits a second RRC signaling in step S5201; receives a first RRC signaling in step S5202; transmits a first-type information block in step S5203; and transmits a third RRC signaling in step S5204.

In Embodiment 5, the first RRC signaling is used to request for data transmission; the first-type information block belongs to a lower layer relative to an RRC layer; in response to the action of receiving a first RRC signaling, the third RRC signaling is transmitted.

In one embodiment, the second RRC signaling is a Radio Resource Control signaling.

In one embodiment, the second RRC signaling is transmitted through an RRC layer message.

In one embodiment, the second RRC signaling is generated by an RRC layer.

In one embodiment, the second RRC signaling is a higher layer signaling.

In one embodiment, a Signaling Radio Bearer (SRB) for the second RRC signaling includes SRB1.

In one embodiment, a Signaling Radio Bearer (SRB) for the second RRC signaling includes SRB2.

In one embodiment, the action of receiving a second RRC signaling is before the action of transmitting a first signaling.

In one embodiment, the second RRC signaling comprises one IE in an RRC message, the IE's name including BWP-Uplink.

In one embodiment, the second RRC signaling comprises one IE in an RRC message, the IE's name including ServingCellConfig.

In one embodiment, the second RRC signaling comprises one or more Information Elements (IEs) in an RRC message.

In one embodiment, the second RRC signaling comprises all or part of an RRC message.

In one embodiment, the second RRC signaling comprises a CCCH message.

In one embodiment, the second RRC signaling comprises a Downlink (DL) message.

In one embodiment, the second RRC signaling comprises a Sidelink (SL) message.

In one embodiment, the second RRC signaling is transmitted via an air interface.

In one embodiment, the second RRC signaling is transmitted via an antenna port.

In one embodiment, the second RRC signaling is used to trigger an entry of the first node into a first status from a second status.

In one embodiment, in response to the action of a second RRC signaling, the first node enters the first status.

In one embodiment, after executing configurations for the second RRC signaling, the first node enters the first status from a second status.

In one subembodiment, the action of entering a first status comprises: being camped in the first status.

In one subembodiment, the action of entering a first status comprises: being kept in the first status.

In one subembodiment, the action of entering a first status comprises: being shifted to the first status.

In one subembodiment, the action of entering a first status comprises: maintaining the first status.

In one embodiment, the first status includes an RRC state.

In one embodiment, the first status is not RRC_CONNECTED state.

In one embodiment, the first status includes RRC-INACTIVE state.

In one embodiment, the first status includes RRC-INACTIVE state.

In one embodiment, the first status includes RRC_IDLE state.

In one embodiment, the first status includes RRC-INACTIVE state.

In one embodiment, the first status includes RRC_IDLE state.

In one embodiment, each SRB in the first status other than SRB0 is suspended.

In one embodiment, the second status includes an RRC state.

In one embodiment, the second status includes RRC_CONNECTED state.

In one embodiment, the second status is RRC_CONNECTED state.

In one embodiment, the second RRC signaling is a Radio Resource Control signaling.

In one embodiment, the second RRC signaling's names include RRC and Release.

In one embodiment, the phrase of the second RRC signaling indicating an expiration value of the first timer comprises that: the second RRC signaling explicitly indicates the first expiration value of the first timer.

In one embodiment, the phrase of the second RRC signaling indicating an expiration value of the first timer comprises that: the second RRC signaling implicitly indicates the first expiration value of the first timer.

In one embodiment, the phrase of the second RRC signaling indicating an expiration value of the first timer comprises that: the second RRC signaling is used to configure the first expiration value of the first timer.

In one embodiment, the phrase of the second RRC signaling indicating an expiration value of the first timer comprises that: the second RRC signaling carries the first expiration value of the first timer.

In one embodiment, the phrase of the second RRC signaling indicating an expiration value of the first timer comprises that: the expiration value of the first timer is configured by a field in the second RRC signaling.

In one embodiment, the phrase of the second RRC signaling indicating an expiration value of the first timer comprises that: the second RRC signaling comprises one RRC message, a field in the RRC message indicating the expiration value of the first timer.

In one embodiment, the phrase of the second RRC signaling indicating an expiration value of the first timer comprises that: the second RRC signaling comprises a RRCRelease message, and the RRCRelease message comprises a SuspendConfig IE, the SuspendConfig IE comprising a field, the field indicating the expiration value of the first timer.

In one embodiment, the phrase of the second RRC signaling indicating an expiration value of the first timer comprises that: the second RRC signaling comprises a RRCConnectionRelease message, and the RRCConnectionRelease message comprises a SuspendConfig IE, the SuspendConfig IE comprising a field, the field indicating the expiration value of the first timer.

In one embodiment, the first RRC signaling indicates a first node's identity.

In one embodiment, the first signaling comprises a first identity.

In one embodiment, the first identity comprises a MAC-I.

In one embodiment, the first identity is used for user authentication or certification.

In one embodiment, the first signaling comprises a second identity.

In one embodiment, the second identity is used to identify user context.

In one embodiment, the second identity is unique in a RAN-based Notification Area (RNA).

In one embodiment, the second identity comprises a I-RNTI.

In one embodiment, the second identity comprises a SDT-RNTI.

In one embodiment, the second identity comprises at least one of a shortI-RNTI or a fullI-RNTI.

In one embodiment, the second identity is used for the first status.

In one embodiment, the second identity is an identity of a user in a first status.

In one embodiment, the first RRC signaling is transmitted through a first uplink radio signal.

In one embodiment, the first identity is configured through a second RRC signaling.

In one embodiment, the second identity is configured through a second RRC signaling.

In one embodiment, a HARQ process corresponding to the first uplink radio signal is a first HARQ process, and a first HARQ process number is a number for the first HARQ process.

In one embodiment, the first RRC signaling is transmitted through a fifth MAC sub-PDU; the first uplink radio signal is obtained by a physical layer processing on a MAC PDU to which the fifth MAC sub-PDU belongs.

In one embodiment, the physical layer processing in the present disclosure comprises at least one of scrambling, modulation, coding, layer mapping or port mapping.

In one embodiment, the phrase of the first RRC signaling being used to trigger the first-type information block comprises: the first uplink radio signal being used to trigger the first-type information block.

In one embodiment, the phrase of the first RRC signaling being used to trigger the first-type information block comprises: the action of transmitting a first uplink radio signal being used to trigger the first-type information block.

In one embodiment, the phrase of the first RRC signaling being used to trigger the first-type information block comprises: the first-type information block indicating whether the first uplink radio signal is correctly transmitted.

In one embodiment, the first-type information block comprises a first HARQ process number.

In one embodiment, the first-type information block comprises a UL Grant DCI.

In one embodiment, the UL Grant DCI comprises a first HARQ process number.

In one embodiment, the first-type information block comprises a second HARQ process number, the second HARQ process number corresponding to the first HARQ process number.

In one embodiment, the DCI comprises a second HARQ process number, the second HARQ process number corresponding to the first HARQ process number.

In one embodiment, the first-type information block is identified by the second identity.

In one embodiment, the first-type information block is identified by the third identity.

In one embodiment, the third identity is a Cell RNTI (C-RNTI).

In one embodiment, the third identity is an identity of a user before receiving the second RRC signaling.

In one embodiment, the third identity is an identity of a user in a second status.

In one embodiment, the third identity is used for a second status.

In one embodiment, the first uplink radio signal comprises a first MAC sub-PDU, and a logical channel corresponding to the first MAC sub-PDU belongs to the first logical channel set.

In one embodiment, the first uplink radio signal comprises a second MAC sub-PDU, and a logical channel corresponding to the second MAC sub-PDU belongs to the first logical channel set.

In one embodiment, the first MAC sub-PDU is different from the second MAC sub-PDU.

In one embodiment, a logical channel corresponding to the first MAC sub-PDU is different from a logical channel corresponding to the second MAC sub-PDU.

In one embodiment, a logical channel corresponding to a MAC sub-PDU comprises that: the MAC sub-PDU comprises a MAC subheader, the MAC subheader indicates a logical channel identity, and a logical channel corresponding to the MAC sub-PDU is identified by the logical channel identity.

In one embodiment, the first MAC sub-PDU comprises a first MAC subheader, the first MAC subheader indicates a logical channel identity, and a logical channel corresponding to the first MAC sub-PDU is identified by the logical channel identity.

In one embodiment, the second MAC sub-PDU comprises a second MAC subheader, the second MAC subheader indicates a logical channel identity, and a logical channel corresponding to the second MAC sub-PDU is identified by the logical channel identity.

In one embodiment, the first uplink radio signal comprises a third MAC sub-PDU, the third MAC sub-PDU indicating a buffer status.

In one embodiment, the first uplink radio signal is transmitted on a Physical Uplink Shared CHannel (PUSCH).

In one embodiment, the first uplink radio signal is transmitted on a Physical Sidelink Shared CHannel (PSSCH).

In one embodiment, the first uplink radio signal is transmitted via an air interface.

In one embodiment, the first uplink radio signal is transmitted via an antenna port.

In one embodiment, in response to a first event, the first uplink radio signal is transmitted, and the first timer is started.

In one embodiment, the action of transmitting a first uplink radio signal and the action of starting a first timer are atomic.

In one embodiment, as a response to the action of transmitting the first uplink radio signal, the first timer is started.

In one embodiment, as a response to the action of transmitting the first uplink radio signal, second indication is transmitted from the lower layer relative to the RRC layer to the RRC layer, the second indication being used to start a first timer.

In one embodiment, the phrase that "as a response to the action of transmitting a first uplink radio signal, the first timer is started" comprises that: transmitting the first uplink radio signal is used to trigger a start of the first timer.

In one embodiment, the phrase that the first RRC signaling is used to request for data transmission comprises that: the first uplink radio signal is used to request for data transmission.

In one embodiment, the phrase that the first uplink radio signal is used to request for data transmission comprises that: the first uplink radio signal indicates that a user has data to be transmitted.

In one embodiment, the phrase that the first uplink radio signal is used to request for data transmission comprises that: the first uplink radio signal indicates BSR.

In one embodiment, the phrase that the first uplink radio signal is used to request for data transmission comprises that: the first uplink radio signal comprises a third MAC sub-PDU, the third MAC sub-PDU indicating a buffer status.

In one embodiment, the buffer status in the present disclosure includes: a user buffer status.

In one embodiment, the buffer status in the present disclosure includes: a Buffer Status Report (BSR).

In one embodiment, the third MAC sub-PDU corresponds to a first logical channel set.

In one embodiment, the third MAC sub-PDU corresponds to a second logical channel set, any logical channel in the second logical channel set belongs to the first logical channel set, the second logical channel set comprising at least one logical channel.

In one subembodiment, the second logical channel set comprises multiple logical channels, with the logical channel being one of the multiple logical channels.

In one subembodiment, the first logical channel set comprises K1 logical channels, with the logical channel being one of the K1 logical channels, where K1 is a positive integer greater than 1.

In one subsidiary embodiment of the above subembodiment, K1 is equal to 2.

In one subsidiary embodiment of the above subembodiment, K1 is no greater than 10240.

In one embodiment, the third RRC signaling is a Radio Resource Control signaling.

In one embodiment, the third RRC signaling is transmitted through an RRC layer message.

In one embodiment, the third RRC signaling is generated by an RRC layer.

In one embodiment, the third RRC signaling is a higher layer signaling.

In one embodiment, a Signaling Radio Bearer (SRB) for the third RRC signaling includes SRB1.

In one embodiment, a Signaling Radio Bearer (SRB) for the third RRC signaling includes SRB2.

In one embodiment, the third RRC signaling comprises at least one of:
a RRCResume message, or a RRCSetup message, or a RRCRelease message, or a RRCRelease message containing a SuspendConfig IE, or a RRCReject message containing a suspend IE.

In one embodiment, the third RRC signaling comprises one or more Information Elements (IEs) in an RRC message.

In one embodiment, the third RRC signaling comprises all or part of an RRC message.

In one embodiment, the third RRC signaling comprises a Downlink (DL) message.

In one embodiment, the third RRC signaling comprises a Sidelink (SL) message.

In one embodiment, the phrase of receiving a third RRC signaling comprises: having received the third RRC signaling.

In one embodiment, the phrase of receiving a third RRC signaling comprises: implementing configurations indicated by the third RRC signaling.

In one embodiment, as a response to the action of receiving a third RRC signaling, the first timer is stopped.

In one embodiment, the action of receiving a third RRC signaling and the action of stopping a first timer are atomic.

In one embodiment, as a response to the action of receiving a third RRC signaling, fifth indication is transmitted to the lower layer relative to the RRC layer from the RRC layer, the fifth indication being used to stop the first timer.

In one embodiment, perform an operation of entering RRC_IDLE status when the first timer overruns.

In one embodiment, the operation of entering RRC_IDLE status comprises: reconfiguring MAC.

In one embodiment, the operation of entering RRC_IDLE status comprises: releasing suspendConfig.

In one embodiment, the operation of entering RRC_IDLE status comprises: releasing UE Inactive AS context.

In one embodiment, when the first timer overruns, execute cell reselection operation.

In one embodiment, when the first timer overruns, initiate connection reestablishment operation.

In one embodiment, when the first timer is of a value of 0, the first timer is overrunning.

In one embodiment, when the first timer is of a value of 1, the first timer is overrunning.

In one embodiment, when the first timer is of a value equal to the expiration value of the first timer, the first timer is overrunning.

In one embodiment, the dotted-line box F5.1 is optional.

In one subembodiment, the dotted-line box F5.1 exists.

In one subembodiment, the dotted-line box F5.1 does not exist.

Embodiment 6

Figure 6:
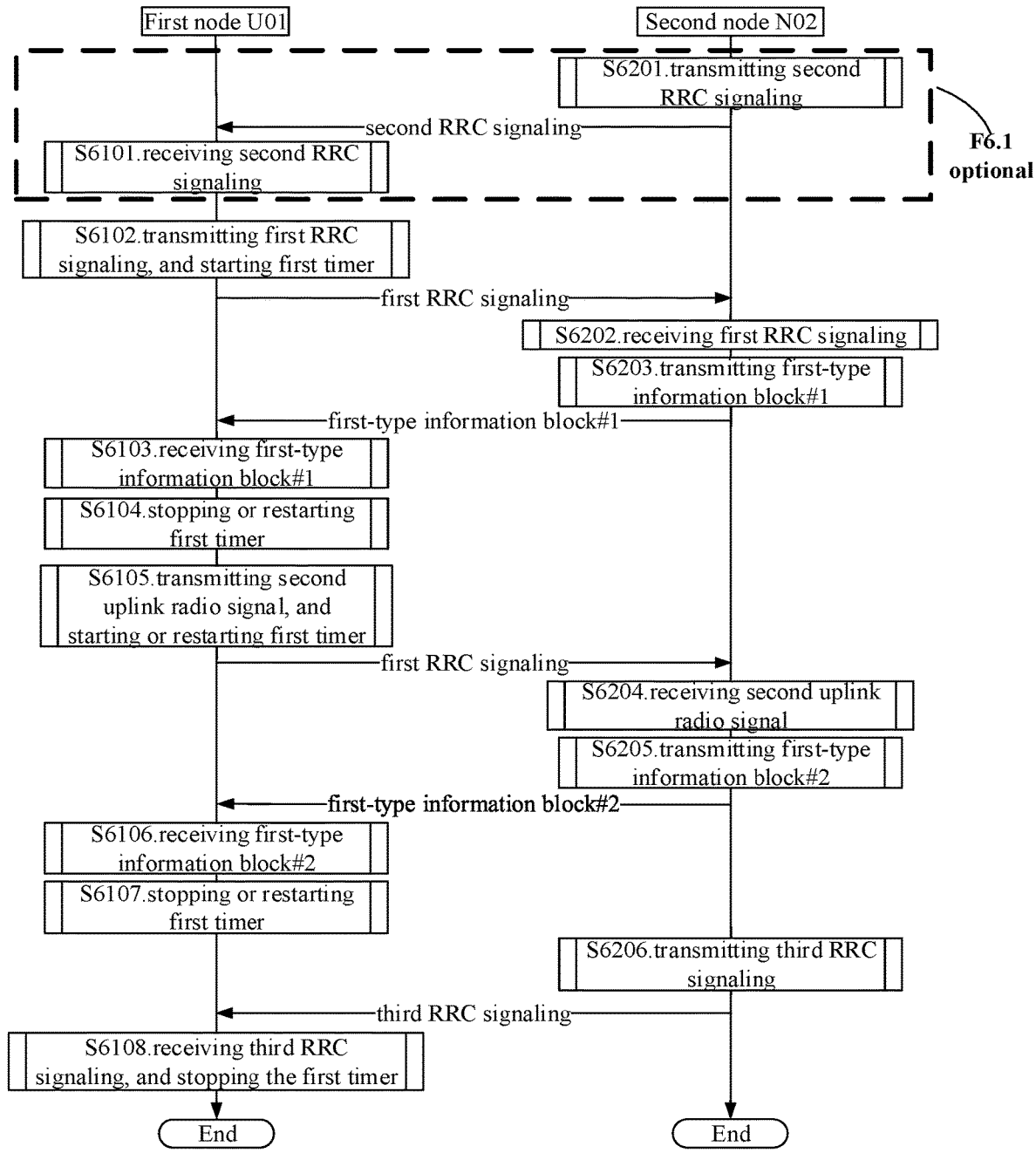
FIG. 6 illustrates a flowchart of radio signal transmission according to another embodiment of the present disclosure.

Embodiment 6 illustrates a flowchart of signal transmission according to another embodiment of the present disclosure, as shown in FIG. 6. It should be particularly noted that the sequence illustrated herein does not set any limit to the signal transmission order or implementation order in the present disclosure.

The first node U01 receives a second RRC signaling in step S6101, the second RRC signaling indicating an expiration value of the first timer; in step S6102, transmits a first RRC signaling, and starts a first timer; and in step S6103, receives a first-type information block #1, the first RRC signaling being used to trigger the first-type information block #1; in step S6104, in response to having received a first-type information block, stops or restarts the first timer; in step S6105, transmits a second uplink radio signal, and starts or restarts a first timer; in step S6106, receives a first-type information block #2, the second uplink radio signal being used to trigger the first-type information block #2; in step S6107, in response to the action of receiving a first-type information block, stops or restarts the first timer; and in step S6108, receives a third RRC signaling, and stops the first timer.

The second node N02 transmits a second RRC signaling in step S6201; receives a first RRC signaling in step S6202; transmits a first-type information block #1 in step S6203; receives a second uplink radio signal in step S6204; transmits a first-type information block #2 in step S6205; and transmits a third RRC signaling in step S6206.

In Embodiment 6, the first RRC signaling is used to request for data transmission; the first-type information block belongs to a lower layer relative to an RRC layer; the second uplink radio signal comprises a fourth MAC sub-PDU; a logical channel corresponding to the fourth MAC sub-PDU belongs to the first logical channel set; in response to the action of receiving a first RRC signaling, the third RRC signaling is transmitted.

In one embodiment, the first-type information block #1 is a first-type information block.

In one embodiment, the first-type information block #2 is a first-type information block.

In one embodiment, in response to the action of receiving a first-type information block, stop the first timer.

In one embodiment, transmit a second uplink radio signal and start a first timer.

In one embodiment, in response to the action of transmitting a second uplink radio signal, start the first timer.

In one embodiment, in response to the action of receiving a first-type information block, restart the first timer.

In one embodiment, transmit a second uplink radio signal and restart a first timer.

In one embodiment, in response to the action of transmitting a second uplink radio signal, restart the first timer.

In one embodiment, a HARQ process corresponding to the second uplink radio signal is a third HARQ process, and a third HARQ process number is a number for the third HARQ process.

In one embodiment, the third HARQ process number is the same as the first HARQ process number.

In one embodiment, the third HARQ process number is different from the first HARQ process number.

In one embodiment, the second uplink radio signal is transmitted on a PUSCH.

In one embodiment, the second uplink radio signal is transmitted on a PSSCH.

In one embodiment, the second uplink radio signal is transmitted via an air interface.

In one embodiment, the second uplink radio signal is transmitted via an antenna port.

In one embodiment, a logical channel corresponding to the fourth MAC sub-PDU is the same as that corresponding to the first MAC sub-PDU.

In one embodiment, a logical channel corresponding to the fourth MAC sub-PDU is different from that corresponding to the first MAC sub-PDU.

In one embodiment, a logical channel corresponding to the fourth MAC sub-PDU is the same as that corresponding to the second MAC sub-PDU.

In one embodiment, a logical channel corresponding to the fourth MAC sub-PDU is different from that corresponding to the second MAC sub-PDU.

In one embodiment, the fourth MAC sub-PDU comprises a fourth MAC subheader, the fourth MAC subheader indicates a logical channel identity, and a logical channel corresponding to the fourth MAC sub-PDU is identified by the logical channel identity.

In one embodiment, the second uplink radio signal is obtained by a physical layer processing on a MAC PDU to which the fourth MAC sub-PDU belongs.

In one embodiment, the physical layer processing in the present disclosure comprises at least one of scrambling, modulation, coding, layer mapping or port mapping.

In one embodiment, in response to a second event, the second uplink radio signal is transmitted, and the first timer is started.

In one embodiment, in response to a second event, the second uplink radio signal is transmitted, and the first timer is restarted.

In one embodiment, the second event comprises that a first uplink radio signal has been transmitted.

In one embodiment, the second event comprises that a first RRC signaling has been transmitted.

In one embodiment, the second event comprises that data to be transmitted has arrived on at least one logical channel in a first logical channel set.

In one embodiment, the second event comprises that data to be transmitted in a first logical channel set is smaller than or equals a second threshold.

In one embodiment, the second event comprises that data to be transmitted in a first logical channel set exceeds a second threshold.

In one embodiment, the second event comprises that data to be transmitted in a first logical channel set does not exceed a second threshold.

In one embodiment, the second event comprises that data to be transmitted in any logical channel in a first logical channel set exceeds a second threshold.

In one embodiment, the second event comprises that data to be transmitted in any logical channel in a first logical channel set is smaller than or equal to a second threshold.

In one embodiment, the second event comprises that data to be transmitted in a first logical channel set is smaller than or equals a first threshold.

In one embodiment, the second event comprises that data to be transmitted in any logical channel in a first logical channel set exceeds a first threshold.

In one embodiment, the second event comprises that data to be transmitted in any logical channel in a first logical channel set is smaller than or equal to a first threshold.

In one embodiment, the second threshold is configured through a second RRC signaling.

In one embodiment, the second threshold is configured through a system message.

In one embodiment, the second threshold is configured through a higher layer signaling.

In one embodiment, the second threshold is configurable.

In one embodiment, the second threshold is pre-configured.

In one embodiment, the second threshold is of a fixed size.

In one embodiment, the second threshold is measured in bits.

In one embodiment, the second threshold is measured in bytes.

In one embodiment, the phrase that the second uplink radio signal is used to trigger the first-type information block #2 comprises: information contained in the second uplink radio signal being used to trigger the first-type information block #2.

In one embodiment, the phrase that the second uplink radio signal is used to trigger the first-type information block #2 comprises: the action of transmitting a second uplink radio signal being used to trigger the first-type information block #2.

In one embodiment, the phrase that the second uplink radio signal is used to trigger the first-type information block #2 comprises: the first-type information block #2 indicating whether the second uplink radio signal is correctly transmitted.

In one embodiment, the phrase that the second uplink radio signal is used to trigger the first-type information block #2 comprises: the first-type information block #2 indicating whether the second uplink radio signal is successfully transmitted.

In one embodiment, the dotted-line box F6.1 is optional.

In one subembodiment, the dotted-line box F6.1 exists.

In one subembodiment, the dotted-line box F6.1 does not exist.

Embodiment 7

Figure 7:
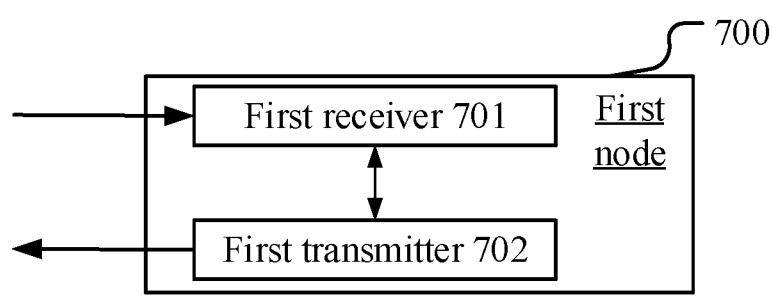
FIG. 7 illustrates a structure block diagram of a processing device used in a first node according to one embodiment of the present disclosure.

FIG. 7 illustrates a structure block diagram of a processing device used in a first node according to one embodiment of the present disclosure; as shown in FIG. 7. In FIG. 7, a processing device 700 in the first node is comprised of a first receiver 701 and a first transmitter 702.

The first transmitter 702 transmits a first RRC signaling, and starts a first timer; and the first receiver 701 receives a first-type information block, the first RRC signaling being used to trigger the first-type information block;

the first transmitter 702, in response to the action of receiving a first-type information block, stops or restarts the first timer.

In Embodiment 7, the first RRC signaling is used to request for data transmission; the first-type information block belongs to a lower layer relative to an RRC layer.

In one embodiment, the first RRC signaling is a Radio Resource Control signaling.

In one embodiment, the first RRC signaling is transmitted through an RRC layer message.

In one embodiment, the first RRC signaling is generated by an RRC layer.

In one embodiment, the first timer is an RRC layer timer.

In one embodiment, the first receiver 701 receives a second RRC signaling.

In one embodiment, the second RRC signaling is a Radio Resource Control signaling.

In one embodiment, the second RRC signaling is transmitted through an RRC layer message.

In one embodiment, the second RRC signaling is generated by an RRC layer.

In one embodiment, the first receiver 701 receives a third RRC signaling, and stops the first timer.

In one embodiment, in response to the action of receiving a first RRC signaling, the third RRC signaling is transmitted.

In one embodiment, the first receiver 701 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 701 comprises the antenna 452, the receiver 454, the multi-antenna receiving processor 458 and the receiving processor 456 in FIG. 4 of the present disclosure.

In one embodiment, the first receiver 701 comprises the antenna 452, the receiver 454 and the receiving processor 456 in FIG. 4 of the present disclosure.

In one embodiment, the first transmitter 702 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 702 comprises the antenna 452, the transmitter 454, the multi-antenna transmitting processor 457 and the transmitting processor 468 in FIG. 4 of the present disclosure.

In one embodiment, the first transmitter 702 comprises the antenna 452, the transmitter 454 and the transmitting processor 468 in FIG. 4 of the present disclosure.

Embodiment 8

Figure 8:
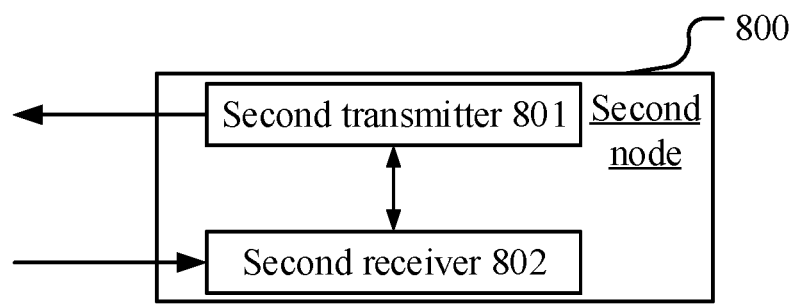
FIG. 8 illustrates a structure block diagram of a processing device used in a second node according to one embodiment of the present disclosure.

FIG. 8 illustrates a structure block diagram of a processing device used in a second node according to one embodiment of the present disclosure; as shown in FIG. 8. In FIG. 8, a processing device 800 in a second node comprises a second transmitter 801 and a second receiver 802.

The second transmitter 801 receives a first RRC signaling; and the second receiver 802 transmits a first-type information block, the first RRC signaling being used to trigger the first-type information block;

In Embodiment 8, the first RRC signaling is used to request for data transmission; the first-type information block belongs to a lower layer relative to an RRC layer; the first-type information block is used to trigger stopping or restarting of a first timer.

In one embodiment, the second transmitter 801 transmits a second RRC signaling.

In one embodiment, the second transmitter 801 transmits a third RRC signaling.

In one embodiment, in response to the action of receiving a first RRC signaling, the third RRC signaling is transmitted.

In one embodiment, the second receiver 802 receives a second message; herein, in response to transmitting of the second message being dropped at the first time, the second message is transmitted at a second time; a time interval between the second time and the first time is related to transmitting data packet through the first Data Radio Bearer (DRB).

In one embodiment, the second transmitter 801 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 801 comprises the antenna 420, the transmitter 418, the multi-antenna transmitting processor 471 and the transmitting processor 416 in FIG. 4 of the present disclosure.

In one embodiment, the second transmitter 801 comprises the antenna 420, the transmitter 418 and the transmitting processor 416 in FIG. 4 of the present disclosure.

In one embodiment, the second receiver 802 comprises the antenna 420, the receiver 418, the multi-antenna receiving processor 472, the receiving processor 470, the controller/processor 475 and the memory 476 in FIG. 4 of the present disclosure.

In one embodiment, the second receiver 802 comprises the antenna 420, the receiver 418, the multi-antenna receiving processor 472 and the receiving processor 470 in FIG. 4 of the present disclosure.

In one embodiment, the second receiver 802 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first transmitter, transmitting a first RRC signaling, and starting a first timer; and
   a first receiver, receiving a first-type information block, the first RRC signaling being used to trigger the first-type information block;
   the first transmitter, in response to the action of receiving a first-type information block, stopping or restarting the first timer;
   wherein the first RRC signaling is used to request for data transmission; the first-type information block belongs to a lower layer relative to an RRC layer.

2. The first node according to claim 1, comprising:
   in response to a first event, the first RRC signaling is transmitted, and the first timer is started.

3. The first node according to claim 2, wherein the first event comprises:
   data to be transmitted has arrived on at least one logical channel in a first logical channel set.

4. The first node according to any of claim 3, comprising:
   the first logical channel set comprises at least one logical channel, and any logical channel in the first logical channel set supports small-packet transmission.

5. The first node according to claim 2, wherein the first event comprises:
   data to be transmitted in a first logical channel set does not exceed a first threshold.

6. The first node according to any of claim 5, comprising:
   the first logical channel set comprises at least one logical channel, and any logical channel in the first logical channel set supports small-packet transmission.

7. The first node according to any of claim 1, comprising:
   the first receiver, receiving a third RRC signaling, and stopping the first timer.

8. The first node according to any of claim 1, comprising:
   the first timer being an RRC layer timer.

9. The first node according to any of claim 1, comprising:
   the first receiver, receiving a second RRC signaling, the second RRC signaling indicating an expiration value of the first timer;
   wherein the phrase of the second RRC signaling indicating an expiration value of the first timer comprises that: the second RRC signaling comprises a RRCRelease message, and the RRCRelease message comprises a SuspendConfig IE, the SuspendConfig IE comprising a field, the field indicating the expiration value of the first timer.

10. The first node according to any of claim 1, wherein the second RRC signaling is used to trigger the first node's entry into a first status from a second status; the first status comprises an RRC_INACTIVE status.

11. The first node according to any of claim 1, wherein in response to the action of receiving a first-type information block, the first timer is stopped.

12. The first node according to any of claim 1, wherein in response to the action of receiving a first-type information block, the first timer is restarted.

13. The first node according to any of claim 1, comprising:
the first receiver, in response to the action of receiving a first-type information block, transmitting fourth indication to an RRC layer from a layer processing the first-type information block, the fourth indication being used to restart the first timer.

14. The first node according to any of claim 1, comprising:
the first transmitter, transmitting a second uplink radio signal, and, in response to the action of transmitting the second uplink radio signal, restarting the first timer.

15. The first node according to claim 14, wherein the second uplink radio signal is transmitted on a PUSCH.

16. The first node according to claim 14, wherein the second uplink radio signal is used to trigger the first-type information block; in response to the action of receiving the first-type information block, the first timer is stopped.

17. The first node according to any of claim 1, comprising:
the first receiver, performing an operation of entering RRC_IDLE status when the first timer overruns.

18. A second node for wireless communications, comprising:
a second receiver, receiving a first RRC signaling; and
a second transmitter, transmitting a first-type information block, the first RRC signaling being used to trigger the first-type information block;
wherein the first RRC signaling is used to request for data transmission; the first-type information block belongs to a lower layer relative to an RRC layer; the first-type information block is used to trigger stopping or restarting of a first timer.

19. The second node according to claim 18, comprising:
the second transmitter, transmitting a second RRC signaling, the second RRC signaling indicating an expiration value of the first timer;
wherein the phrase of the second RRC signaling indicating an expiration value of the first timer comprises that: the second RRC signaling comprises a RRCRelease message, and the RRCRelease message comprises a SuspendConfig IE, the SuspendConfig IE comprising a field, the field indicating the expiration value of the first timer.

20. A method in a first node for wireless communications, comprising:
transmitting a first RRC signaling, and starting a first timer; and
receiving a first-type information block, the first RRC signaling being used to trigger the first-type information block;
in response to the action of receiving a first-type information block, stopping or restarting the first timer;
wherein the first RRC signaling is used to request for data transmission; the first-type information block belongs to a lower layer relative to an RRC layer.

* * * * *